Nov. 15, 1949     I. J. SPAETH     2,488,342
BRAKE GEAR SUPPORT

Filed Nov. 13, 1945     2 Sheets-Sheet 1

INVENTOR
IRVIN J. SPAETH
BY Rodney Bedell
ATTORNEY

Nov. 15, 1949    I. J. SPAETH    2,488,342
BRAKE GEAR SUPPORT

Filed Nov. 13, 1945    2 Sheets-Sheet 2

INVENTOR
IRVIN J. SPAETH
BY Rodney Bedell
ATTORNEY

Patented Nov. 15, 1949

2,488,342

UNITED STATES PATENT OFFICE 2,488,342

BRAKE GEAR SUPPORT

Irvin J. Spaeth, Chicago, Ill., assignor to Chicago Railway Equipment Company, Chicago, Ill., a corporation of Illinois Application November 13, 1945, Serial No. 628,257

6 Claims. (Cl. 188—210)

The invention relates to the safeguarding and supporting of railway truck brake gear and is particularly adapted for association with a spring plank, or like main truck part, to form a safety guard for the bottom connection rod extending between the brake beams at opposite ends of the truck.

The main object of the invention is to provide a support device which is economical to manufacture and readily applied to and removed from a truck carrier part, such as a spring plank, and will accommodate application to truck parts of varying width and depth.

Another object is to provide for the secure application of the device to a carrier part without notching, punching, or otherwise machining the carrier part.

These and other detailed objects as will appear from the following description are attained by the construction illustrated in the accompanying drawings in which.

Figures 3, 4:
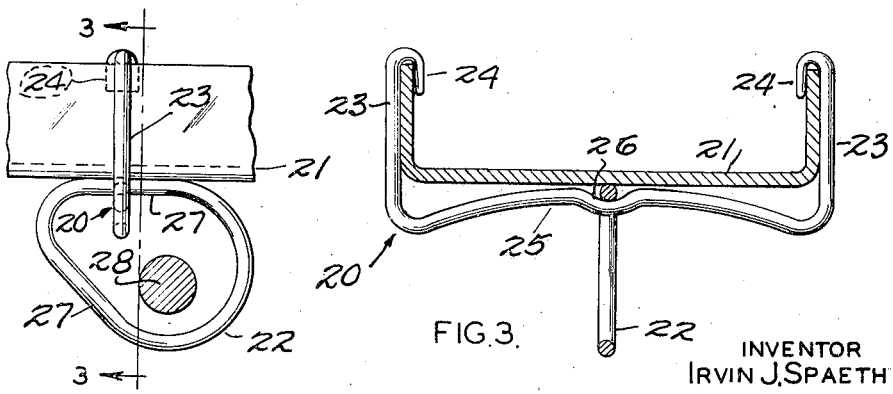
Figure 3 is a section through a spring plank as shown in Figure 1 with another form of support device applied thereto.
Figure 4 is a side view of a portion of the spring plank shown in Figure 3 with the support device.
Figure 5:
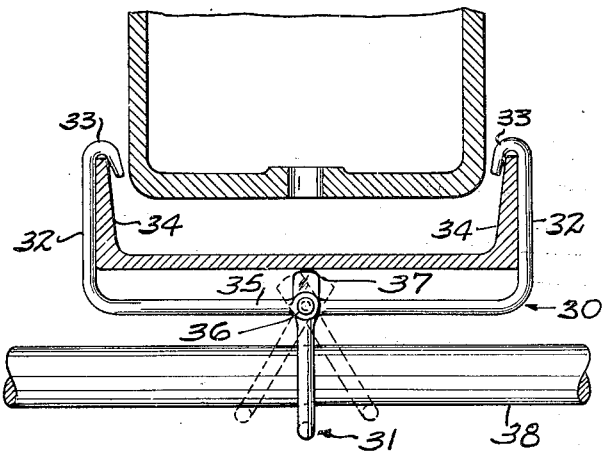
Figure 6:
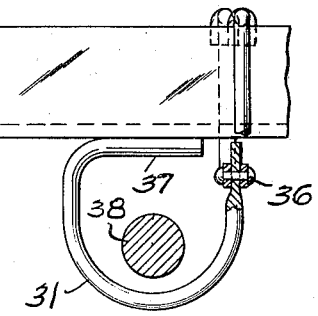

Figures 5 and 6 correspond to Figures 3 and 4, but illustrate another form of the invention.

Figure 7:
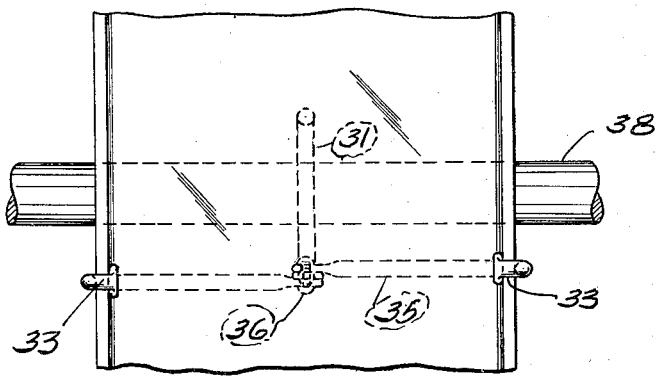

Figure 7 is a top view of the structure shown in Figures 5 and 6.

Figure 1:
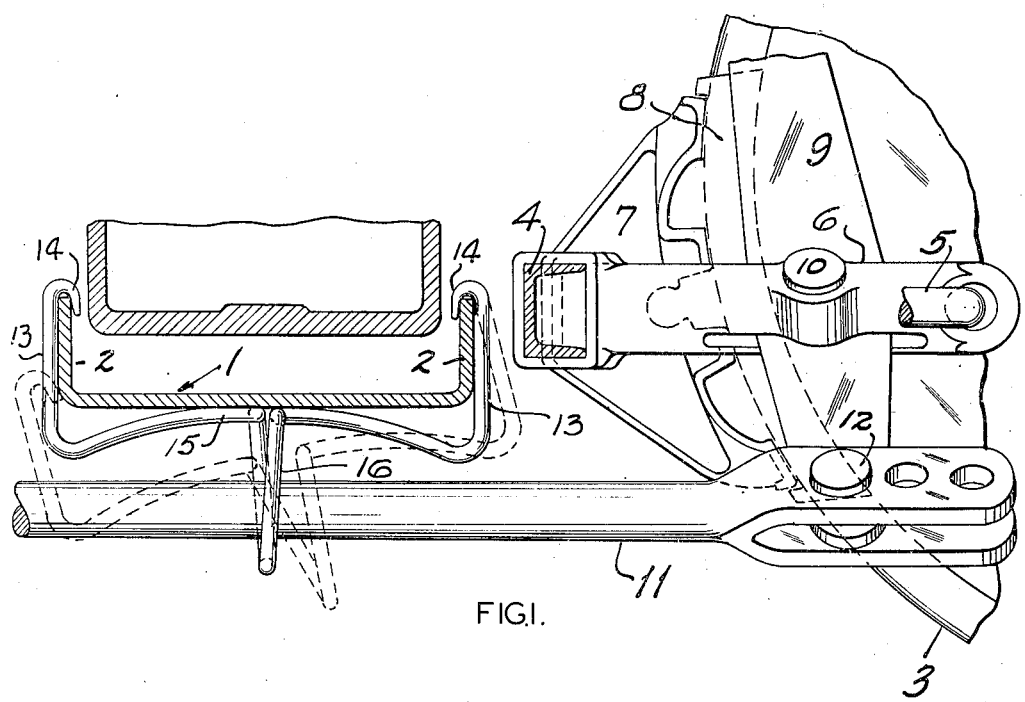
Figure 1 is a vertical section taken longitudinally through a restricted portion of a four-wheel truck and showing a channel-shaped spring plank and adjacent portions of the truck bolster and brake gear.
Figure 2:
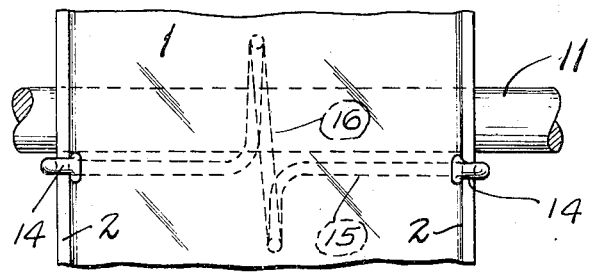
Figure 2 is a top view of the intermediate portion of the spring plank showing the brake gear support applied thereto.

In Figures 1 and 2, the spring plank 1 consists of a pressed plate channel with upstanding flanges 2. It will be understood that this spring plank extends from side to side of the truck and is mounted upon truck side frames (not shown) which are mounted upon the usual boxes (not shown) applied to the usual axles (not shown) mounted on wheels, one of which is indicated at 3. A brake beam is applied to each pair of wheels and may be of a well-known truss type including a compression member 4, a tension member 5, a strut 6, brake heads 7, and shoes 8, all suspended from the truck by the usual swing hangers (not shown), or otherwise. The brakes are applied to the wheels by levers 9 which are pivotally connected to struts 6 by pins 10. The lower ends of levers 9 are interconnected by bottom rod 11 pinned to the levers at 12.

Ordinarily, bottom rod 11 will be supported by levers 9, the brake beam, and the brake hangers, but in the event of failure of one or more of pins of 10 or 12 or of the brake hangers, the rod and one or both of the associated brake beams will be held against dropping to the track by a safety support here shown as a one-piece rod with upright end portions 13, terminating in downwardly facing hooks 14 adapted to receive the upper edges of spring plank 2, and an intermediate portion extending from side to side of the spring plank and beneath the same and bulged upwardly as indicated at 15 into contact with the bottom of the spring plank and forming an upwardly opening loop 16 which receives bottom rod 11.

The device is readily applied to the spring plank by pressing one hook 14 over one of the spring plank flanges and springing the device from the broken line position shown in Figure 1 to the full line position, distorting the bulged intermediate portion and the loop a substantial distance transversely and longitudinally of the support as may be required to permit the other end portion 13 to set over the corresponding flange.

By making end portions 13 of substantially greater depth than flanges 2 and by bulging the intermediate portion of the device as shown and by making the loop open, the device is adapted to be applied to spring planks of varying width and depth of flange without requiring any adjustment in the device itself, or the use of any accessory fittings which may be adjusted to adapt the device for different spring planks. The spaced friction contacts between the support device and spring plank serve to retain the support upon the spring plank in a desired position without notching, drilling, or punching the spring plank and passing the support device through it.

Figures 3 and 4 illustrate another form of the invention embodying a two-part device including a bracket 20 for application to the spring plank 21 and a depending link 22 suspended from the intermediate portion of the bracket. Bracket 20 has end portions 23 with downturned hooks 24 and with an intermediate upwardly bulged portion 25 similar to the corresponding parts of the supports shown in Figures 1 and 2, but in place of an integral loop encircling the bottom rod as previously described, the intermediate portion of bracket 20 is recessed as indicated at 26 to receive a link 22 and preferably hold it in frictional contact with the bottom of the spring plank. The link may be circular or may have elongated straight sides as shown at 27, in which case the link may be shifted to opposite sides of the bracket to accommodate the positioning of the bottom connection rod 28 at either side of the longitudinal center line of the truck.

Figures 5, 6, and 7 illustrate another form of the invention comprising a bracket 30 and a depending link 31 for encircling the bottom connection 38. Bracket 30 has end portions 32 with downturned hooks 33 arranged to engage the upper edges of spring plank flanges 34. The intermediate portion 35 of bracket 30 extends beneath the spring plank and pivotally mounts link 31 through a pin or rivet 36 through one end of the link. The other end of the link extends upwardly above the level of pin 36 and terminates in a horizontal arm 37 which frictionally engages the lower face of the spring plank when the link is shifted from either of the broken line positions shown in Figure 5 to the solid line position. This causes the link arm 37 to be thrust upwardly against the spring plank and the end portions 32 are thrust downwardly. In this form of the invention, the bracket is shown made of two parts which are interconnected by the pin 36, but it will be understood that the bracket may be made in one piece which may be bulged upwardly near the center and distorted downwardly by swinging link 31 as described.

All forms of the device described above are well adapted for the intended purpose as set forth in the introductory portion of the specification. The details of the structure may be modified otherwise than as is shown without departing from the spirit of the invention and the exclusive use of modifications coming within the scope of the claims is contemplated.

What is claimed is:

1. A brake gear support comprising end portions, arranged for application to the sides of a railway truck spring plank or like carrier part and to extend downwardly to points spaced below the carrier part, and a portion extending between said end portions and having a part intermediate said end portions arranged to be distorted a substantial distance transversely and longitudinally of the support so as to be thrust upwardly against the bottom of the carrier part and to elongate the support by the inherent resiliency of the structure, there being a brake gear support member depending from said intermediate part and spaced from said end portions.

2. A railway brake gear support comprising a one-piece rod like member with upstanding arms at each end, terminating in downturned hooks, and intermediate said ends forming an upwardly open loop for receiving a brake gear member, the loop forming a spring-like coil for drawing the end portions towards each other.

3. A railway brake gear support comprising an elongated member forming an upwardly open loop in a plane extending transversely of the length of the member and intermediate the ends of the member, said ends including downwardly open hooks arranged to engage the sides of a spring plank or like truck part to which the support is applied.

4. A railway truck brake gear member support comprising laterally spaced end portions and a connecting portion, each of said end portions having a downwardly facing element for engaging a carrier part on the truck to which the support is applied, and the connecting portion forming an upwardly open, gear member-receiving loop extending in a plane transversely of the length of the support, the support being formed of a continuous length of rod like material of sufficient elasticity to permit the loop to distort to accommodate the spreading apart of said end portions so that they may grip the sides of the carrier part to which the device is applied.

5. A railway truck brake gear support comprising laterally spaced end portions and a connecting portion with an upward bulge intermediate said end portions, each of said end portions having a downwardly facing element for engaging a carrier part on the truck to which the support is applied, and the connecting portion forming an upwardly open loop extending in a plane transversely of the length of the support, the support being formed of a continuous length of rod-like material of sufficient elasticity to permit the loop to distort and the bulge to straighten to vary the overall width and depth of the support and adapt it for different sizes of carrier parts.

6. A railway brake gear support comprising a one piece rod having end portions disposed upright with hook-like terminals to engage the sides and the tops of the sides of a spring plank or like truck part and, between said end portions, having an intermediate portion offset transversely of the length of the support a substantial distance to provide for yielding of the support lengthwise to permit the end portions to be sprung over the tops of the sides of the truck part and being bowed upwardly to yieldingly engage the bottom of the truck part, said intermediate portion forming a depending loop immediately beneath the upwardly bowed portion and arranged to receive a brake gear part.

IRVIN J. SPAETH.

REFERENCES CITED

The following references are of record in the file of this patent:

UNITED STATES PATENTS

| Number | Name | Date |
|---|---|---|
| 1,735,659 | Stebler | Nov. 12, 1929 |
| 1,867,000 | Crone | July 12, 1932 |
| 1,890,989 | Hart | Dec. 13, 1932 |
| 2,047,455 | Anderson | July 14, 1936 |
| 2,067,587 | Zweibel | Jan. 12, 1937 |